US008304927B2

(12) United States Patent
Cote et al.

(10) Patent No.: US 8,304,927 B2
(45) Date of Patent: Nov. 6, 2012

(54) SYSTEMS AND METHODS FOR PROVIDING AC POWER FROM MULTIPLE TURBINE ENGINE SPOOLS

(75) Inventors: Richard A. Cote, Mill Creek, WA (US); Farhad Nozari, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/275,160

(22) Filed: Oct. 17, 2011

(65) Prior Publication Data
US 2012/0091716 A1 Apr. 19, 2012

Related U.S. Application Data

(63) Continuation of application No. 12/326,633, filed on Dec. 2, 2008, now Pat. No. 8,039,983.

(51) Int. Cl.
H02K 7/18 (2006.01)
(52) U.S. Cl. ............. 290/52; 290/32; 290/40 A; 290/51
(58) Field of Classification Search ............. 290/31–32, 290/40 R, 40 A, 40 B, 40 E, 51–52
See application file for complete search history.

(56) References Cited

U.S. PATENT DOCUMENTS

| 5,867,979 | A | 2/1999 | Newton et al. |
|---|---|---|---|
| 5,899,411 | A | 5/1999 | Latos et al. |
| 6,127,758 | A | 10/2000 | Murry et al. |
| 6,467,725 | B1 * | 10/2002 | Coles et al. ..................... 244/58 |
| 6,914,344 | B2 * | 7/2005 | Franchet et al. ................ 290/52 |
| 6,931,856 | B2 * | 8/2005 | Belokon et al. ................. 60/772 |
| 7,188,475 | B2 * | 3/2007 | McGinley et al. .............. 60/726 |
| 7,224,082 | B2 * | 5/2007 | Bouiller et al. ................. 290/52 |
| 7,468,561 | B2 * | 12/2008 | Kern et al. ..................... 290/4 A |
| 7,513,120 | B2 * | 4/2009 | Kupratis ......................... 60/791 |
| 7,584,600 | B2 * | 9/2009 | Klingels ................... 60/39.183 |
| 7,605,483 | B2 * | 10/2009 | Kern et al. .................... 290/4 A |
| 8,039,983 | B2 | 10/2011 | Cote et al. |
| 2006/0042252 | A1 | 3/2006 | Derouineau |
| 2006/0061213 | A1 | 3/2006 | Michalko |

OTHER PUBLICATIONS

Continously variable transmission; http//en.wikipedia.org/wiki/Continuously_variable_transmission; 10 pgs; accessed Sep. 30, 2008.
CVT-Continuously Variable Transmission; http://cvt.com.sapo.pt/hydrostatic/hydorstatic.htm; 4 pgs; accessed Nov. 5, 2008.
Dovat, Francois, "The Nissa Jatco 'Extroid' CVT", http://www.histomobile.com/dvd_histomobile/histomo/tech/90-2.asp; accessed Sep. 30, 2008; 3 pgs.

(Continued)

Primary Examiner — Thanh Lam
(74) Attorney, Agent, or Firm — Perkins Coie LLP

(57) ABSTRACT

Systems and methods for providing AC power from multiple turbine engine spools are disclosed. An aircraft system in a particular embodiment includes an engine having a first shaft connected and a second shaft. The aircraft system can further include a bus system and a first energy converter including a starter/generator, coupled between the first shaft and the bus system to convert a first variable frequency energy transmitted by the first shaft to a first generally constant frequency energy. A second energy converter can be coupled between the second shaft and the bus system, with the second energy converter including a generator to convert a second variable frequency energy transmitted by the second shaft to a second generally constant frequency energy.

25 Claims, 5 Drawing Sheets

OTHER PUBLICATIONS

Goi, T. et al., "Development of Traction Drive IDG(T-IDG)", International Congress of Continuously Variable and Hybrid Transmissions, 5 pgs, Sep. 12-14, 2007, Society of Automotive Engineers of Japan, Inc.

Goi, T. et al., "Traction Drive CVT Technologies for Aircraft Equipment," Proceedins of the 2007 ASME International Design Engineering Technical Conference & computers and Information Engineering Conferences, 6 pgs, Sep. 4-7, 2007, Las Bevad, Nevada.

How CVT's Work; http://auto.howstuffworks.com/cvt3.htm; 4 pgs; accessed Sep. 30, 2008.

Notes on Continuously Variable Tranmissions; http://www.gismology.net/cvt.htm; accessed Nov. 5, 2008; 5 pgs.

* cited by examiner

SYSTEMS AND METHODS FOR PROVIDING AC POWER FROM MULTIPLE TURBINE ENGINE SPOOLS

CROSS-REFERENCE TO RELATED APPLICATION

This is a continuation application of U.S. patent application Ser. No. 12/326,633, filed Dec. 2, 2008, entitled "SYSTEMS AND METHODS FOR PROVIDING AC POWER FROM MULTIPLE TURBINE ENGINE SPOOLS," which is herein incorporated by reference in its entiretly.

TECHNICAL FIELD

The present disclosure is directed generally to systems and methods for providing alternating current (AC) power from multiple turbine engine spools, for example, constant frequency AC power from multiple spools of an aircraft turbofan engine.

BACKGROUND

Modern commercial transport aircraft are typically driven by two or more high bypass ratio turbofan engines. These engines include a fan that provides a significant fraction of the overall propulsion system thrust. An engine core drives the fan as well as one or more compressors, and produces additional thrust by directing exhaust products in an aft direction.

In addition to providing thrust to propel the aircraft, and powering the aircraft hydraulic and pneumatic systems, the turbofan engines provide electrical power to many aircraft components, including the environmental control system, aircraft computers, hydraulic motor pumps, and/or other motors and electrical devices. One approach to obtaining electrical power from the aircraft engines is to convert the rotational motion of the turbomachinery components to electrical power. While this approach has been generally effective, the manner in which the power is extracted from the engines is not always efficient. This in turn can create additional inefficiencies as automated aircraft systems and/or crew compensate or overcompensate for an initially inefficient power extraction. Accordingly, there remains a need for more efficient techniques for extracting electrical power from aircraft turbofan engines.

SUMMARY

The following summary is provided for the benefit of the reader only, and is not intended to limit in any way the invention as set forth by the claims. An aircraft system in accordance with a particular embodiment includes a turbofan engine that in turn includes a compressor, a first turbine, and a first shaft connected between the compressor and the first turbine. The engine further includes a fan, a second turbine, and a second shaft connected between the fan and the second turbine. The system can further include a power bus, a first energy converter coupled between the first shaft and the power bus, and a second energy converter coupled between the second shaft and the power bus. The first energy converter can include a synchronous starter/generator and can be positioned to convert a first variable frequency energy transmitted by the first shaft to a first generally constant frequency energy. The second energy converter can include a synchronous generator and can be positioned to convert a second variable frequency energy transmitted by the second shaft to a second generally constant frequency energy, with the second generally constant frequency energy in phase with and at generally the same frequency as the first generally constant frequency energy. A controller can be operatively coupled to the starter/generator and the generator, for example, to control functions of these components.

In a further particular embodiment, the first energy converter can include a mechanical continuously variable transmission connected between the first shaft and the starter/generator. The continuously variable transmission can include a variable rotation rate input shaft and a constant rotation rate output shaft. In another embodiment, the starter/generator can include a variable frequency generator and the first energy converter can further include an electrical inverter coupled to the starter/generator to receive a variable frequency electrical power and produce a constant frequency output power.

A method for operating an aircraft system in accordance with a particular embodiment includes starting a turbofan engine by driving a first shaft with a starter/generator, with the first shaft being connected between a compressor and a first turbine of the engine. The method can further include extracting a first portion of energy from the first shaft with the starter/generator, and extracting a second portion of energy from a second shaft connected between a fan and a second turbine of the engine. The first portion of energy can be converted from a first variable frequency to a first fixed frequency, and the second portion of energy can be converted from a second variable frequency to a second fixed frequency generally identical to the first fixed frequency. The method can still further include distributing the first and second portions of energy to aircraft components via a common electrical bus.

DETAILED DESCRIPTION

The following disclosure describes systems and methods for providing alternating current (AC) power, e.g., constant frequency power, from multiple turbine engine spools, and associated systems, arrangements and methods. Certain specific details are set forth in the following description and in FIGS. 1-4 to provide a thorough understanding of various embodiments of the disclosure. Other details describing well-known structures and systems often associated with aircraft power systems are not set forth in the following description to avoid unnecessarily obscuring the description of the various disclosed embodiments.

Figure 1:
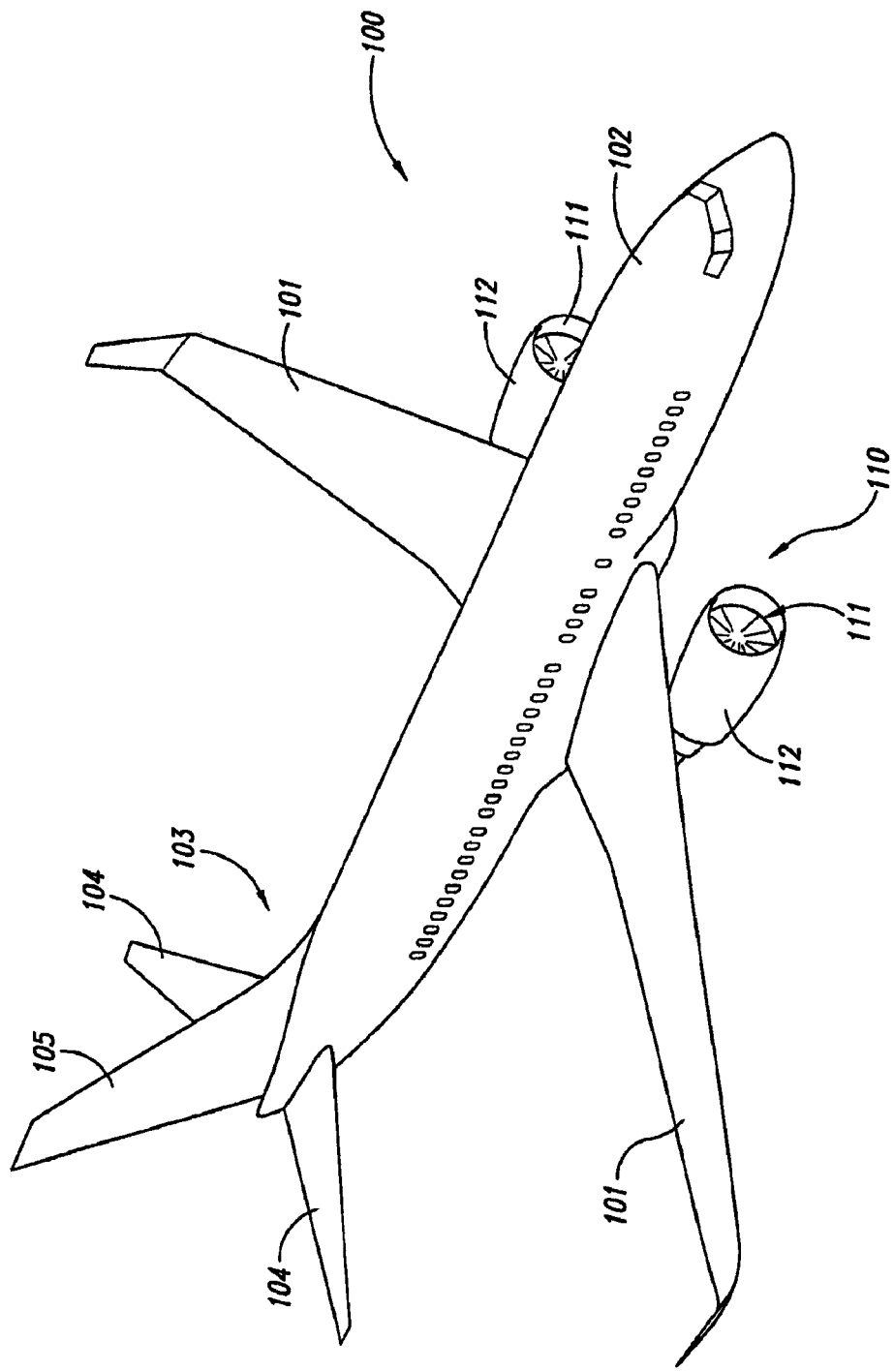
FIG. 1 is a partially schematic, isometric illustration of an aircraft that can include power systems in accordance with embodiments of the disclosure.

FIG. 1 is a partially schematic, isometric illustration of an aircraft 100 that includes a fuselage 102, wings 101, and an empennage 103. The empennage 103 can include horizontal stabilizers 104 and a vertical stabilizer 105. The aircraft 100 further includes a propulsion system 110. In a particular embodiment shown in FIG. 1, the propulsion system 110 includes two wing-mounted nacelles 112, each carrying a turbofan engine 111. In other embodiments, the propulsion system 110 can include other arrangements, for example, engines carried by other portions of the aircraft 100 including the fuselage 102 and/or the empennage 103. In a particular embodiment shown in FIG. 1, the engines 111 include high bypass ratio turbofan engines, but in other embodiments, the engines 111 can have other configurations, including turbojet arrangements. In any of the foregoing embodiments, mechanical energy is extracted from the engines 111 and converted to electrical energy to power a variety of components and systems on board the aircraft, including, but not limited to environmental control systems, computer systems, electrical actuators, and electrical motors. Further details of arrangements for providing the power in an efficient manner are described below with reference with to FIG. 2-4.

Figure 2:
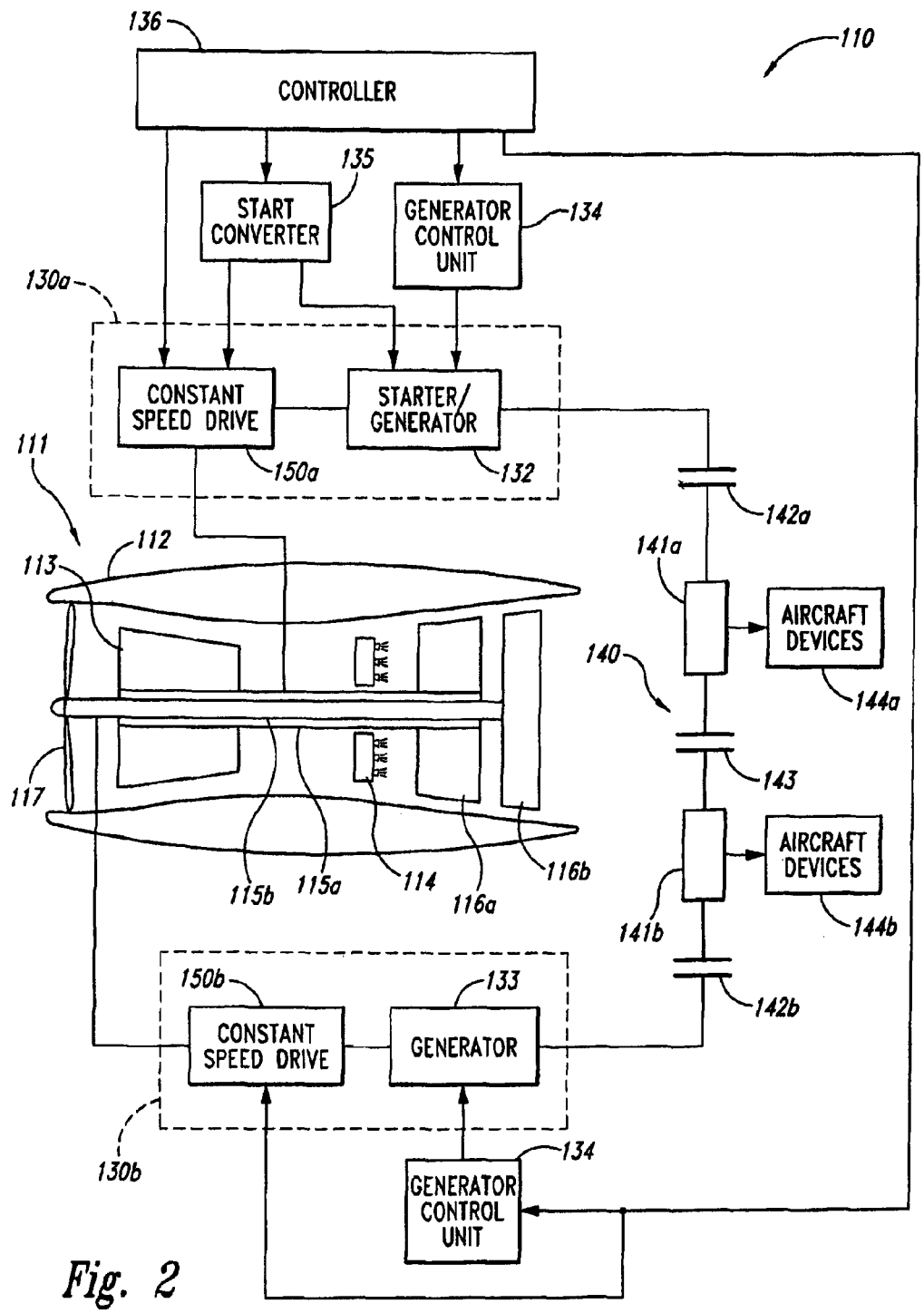
FIG. 2 is a schematic diagram illustrating components of a system for producing AC electrical power from an aircraft engine in accordance with a particular embodiment.

FIG. 2 is a schematic block diagram of a representative system 110 that includes one or more engines 111 (one is shown in FIG. 2 for purposes of illustration) and associated components used to extract electrical power from the engine 111. The engine 111 can include a compressor 113 housed within the nacelle 112 and coupled to a first turbine 116a via a first shaft 115a. The compressor 113, first turbine 116a and first shaft 115a can form a first, high pressure spool. The engine 111 can further include a fan 117 coupled to a second turbine 116b via a second shaft 115b. The fan 117, second turbine 116b and second shaft 115b can form a second, low pressure spool. The second shaft 115b can be positioned annularly inwardly from the first shaft 115a so that the shafts can rotate at different speeds. In operation, the compressor 113 compresses incoming air, which is then provided to a combustor 114. Fuel is injected into the compressed air and ignited at the combustor 114 and the hot exhaust products are expanded through the first turbine 116a to drive the compressor 113. The exhaust gases are further expanded through the second turbine 116b to drive the fan 117, which directs bypass air around the compressor 113, the first turbine 116a and the second turbine 116b.

The system 110 can further include a first energy converter 130a operatively coupled to the first shaft 115a and a second energy converter 130b operatively coupled to the second shaft 115b. The couplings between the shafts 115a, 115b and the corresponding energy converters 130a, 130b can include gear boxes or other devices that extract rotational energy from the shafts 115a, 115b. The first energy converter 130a can include a first constant speed drive 150a coupled to a synchronous starter/generator 132. The second energy converter 130b can include a second constant speed drive 150b coupled to a synchronous generator 133. The synchronous starter/generator 132 can provide both engine starting functions and electrical power generation functions, while the synchronous generator 133 typically provides only electrical power generation functions.

The first and second constant speed drives 150a, 150b can be configured to receive a variable frequency input and provide a constant frequency output. For example, as the speed of the first shaft 115a changes during engine operation, the first constant speed drive 150a can provide a constant speed output that is provided to the synchronous starter/generator 132. Similarly, the second constant speed drive 150b can receive energy at a varying frequency from the second shaft 115b and can provide a constant speed output to the synchronous generator 133. In addition, the speeds (e.g., rotational speeds or frequencies) of the outputs provided by the constant speed drives 150a, 150b can be controlled, modulated and/or set to be identical or very similar. Accordingly, the power provided by the synchronous starter/generator 132 will be at a first frequency and the power provided by the synchronous generator 133 will be at a second frequency that is identical or very close to the first frequency. In a further aspect of this embodiment, the electrical power provided by the starter/generator 132 is provided in phase with the electrical power provided by the generator 133.

The first energy converter 130a and the second energy converter 130b are both coupled to an electrical power bus 140. In a particular embodiment, the first energy converter 130a is coupled to a first portion 141a of the bus 140 via a first contactor 142a. The second energy converter 130b is coupled to a second portion 141b of the bus 140 via a second contactor 142b. The two portions 141a, 141b of the bus 140 are coupled via a tie switch or other coupling 143 that is normally closed. The tie switch 143 can be normally closed because the power provided by the first energy converter 130a and the second energy converter 130b can be regulated to be at the same frequency. In addition, as noted above, the power provided by each of the two energy converters can be regulated to be in appropriate phase angle relationship with the other to achieve a desired output power sharing between the two converters. When the tie switch 143 is opened, the frequencies can be very close to each other but need not be exactly the same.

The first portion 141a of the bus 140 can be coupled to a set of first aircraft devices 144a, and the second portion 141b of the bus 140 can be coupled to a set of second aircraft devices 144b. During normal operation, the first and second contactors 142a, 142b are closed, as is the tie switch 143. Accordingly, power is provided from the bus 140 to both sets of aircraft devices 144a, 144b. In the unlikely event that the second energy converter 130b or related particular system components fail, the second energy converter 130b can be isolated from the bus 140 by opening the second contactor 142b, while the first energy converter 130a continues to provide power to both sets of aircraft devices 144a, 144b. Similarly, if the first energy converter 130a or related components fail, the first energy converter 130a can be isolated from the bus 140 by opening the first contactor 142a, while the second energy converter 130b provides power to both sets of aircraft devices 144a, 144b. Accordingly, the common bus 140 can provide in-phase power to both sets of aircraft devices 144a, 144b when power is provided by both the energy converters 130a, 130b, and when power is provided by only one of the energy converters 130a, 130b. In still a further mode, if either of the bus portions 141a, 141b were to fail, the failed bus portion can be isolated by opening the tie switch 143. In case of an engine failure that renders the energy converters 130a and 130b inoperative, the bus 140 can be connected to the corresponding bus(es) of one or more other engine(s) to power the aircraft devices 144a and 144b.

As discussed above, the AC power provided by each energy converter 130a, 130b can match or approximately match the frequency of the AC power provided by the other, and can be in phase with the power provided by the other. For example, in a particular embodiment, the energy converters 130a, 130b can provide alternating current power at a frequency of about 400 Hz. The frequencies produced by the two energy converters 130a, 130b can float relative to each other when the tie switch 143 is open. When the tie switch 143 is closed, the energy converters 130a, 130b can provide energy at identically the same frequency. The phase angle difference between one converter relative to the other can be adjusted to control the power sharing between the converters. The constant speed drives 150a, 150b can provide this consistency despite large variations in the speeds with which the first and second shafts 115a, 115b rotate. For example, the rotation rate of the first shaft 115a can vary by a factor of about two between an engine idle condition and a full thrust condition. The rotation rate of the second shaft 115b can vary by a factor of about five or more between engine idle and a full thrust. In a particular embodiment, the rotation rate for the first shaft 115a varies from about 5000 RPM to about 10000 RPM, and the rotation rate for the second shaft 115b varies from about 1000 RPM to about 5000 RPM. These ranges can have different values for different engines, but generally, the range is greater for the second shaft 115b than for the first shaft 115a. In any of these embodiments, the power sharing arrangement between the two shafts can provide engine benefits, for example, improving engine operability at low power settings.

The ability to provide constant frequency, in-phase alternating current power to a common bus from two different shafts having widely varying rotation rates can provide a variety of benefits. For example, one expected benefit of this arrangement is that the first shaft 115a (e.g. the high pressure shaft) need not be relied upon exclusively for providing electrical power to electrically driven aircraft devices. Over the course of time, engine designers have increased aircraft engine bypass ratios in an effort to improve engine efficiency, and as a result, a greater fraction of the total engine thrust is transmitted by the second shaft 115b and a lesser fraction by the first shaft 115a. Accordingly, the power available for extraction from the first shaft 115a can be limited, particularly at low power settings. As a consequence, the operator (e.g., the aircraft power management computer or the pilot) may be forced to "shed" or shut down one or more of the aircraft devices 144a, 144b during low engine power settings, to avoid extracting too much power from the first shaft 115a. Alternatively, the operator can increase the rotational speed of the engine 111 in order to provide enough power for all the desired electrical devices 144a, 144b. However, this may lead to an inefficient operation of the engine because the entire engine is driven at a higher rate simply to provide sufficient electrical power. For example, if the engine power is increased during flight, this can result in a thrust level that is greater than necessary or desired, and can therefore increase fuel consumption. If the engine power is increased on the ground beyond what is required for the normal ground idle condition, the operator may need to ride the aircraft brakes to prevent aircraft overspeed, which increases the wear on the brakes. By extracting power from both the first shaft 115a and the second shaft 115b, both of the foregoing problems can be avoided. In a particular embodiment approximately 50% of the power required by the aircraft devices 144a, 144b can be provided by the second shaft 115b via the second energy converter 130b. In other embodiments, the second energy converter 130b can provide other fractions of the overall electrical power required by the aircraft.

Another expected benefit of the foregoing arrangement is that, by providing power extracted from both the first shaft 115a and the second shaft 115b to a common bus 140, the operator has a greater degree of control over which of the aircraft devices 144a, 144b can be operated at any point in time. In particular, with a common bus 140, any of the aircraft devices 144a, 144b, and any combination of aircraft devices 144a, 144b can be operated so long as the combined electrical power provided by the first energy converter 130a and second energy converter 130b is sufficient, without regard as to whether the power is provided by the first shaft 115a or the second shaft 115b. This is unlike some existing arrangements in which the power provided by the two shafts cannot be "mixed" on a common bus (due to frequency/phase incompatibility), and as a result, each shaft in these existing arrangements can provide power to only a certain subset of aircraft devices 144a, 144b.

A further expected benefit of at least some of the foregoing embodiments is that the operator can taxi the aircraft on a single engine without having to cut power to the aircraft devices 144a, 144b. In particular, the ability to extract some of the required power from the second shaft 115b and provide the power together with power extracted from the first shaft 115a on a common bus 140 allows the operator to provide power to any of the aircraft devices 144a, 144b using a single engine during taxi, which can improve overall fuel consumption. This benefit can also extend to in-flight engine-out operation, allowing the operator greater flexibility in selecting which electrically powered devices receive power during an in-flight engine shut down. Still further, during in-flight idle (e.g., during decent), the fan 117 can windmill, providing power to any desired aircraft devices even at idle power settings. Accordingly, in any of the foregoing embodiments, and in particular, during ground taxi and idle decent, the operator can continue to operate the electrically powered components of the aircraft without an uncommanded reduction in electrical loads. For example, the operator can power a set of electrical devices during cruise or powered decent, then shift to idle decent without having electrical devices automatically shut down due to lack of available power. In another example, the operator can operate the aircraft over a series of flight segments that include pre-take-off ground maneuvers, take-off, climb, cruise, decent, landing, and post-landing ground maneuvers while the AC power provided to the electrical components of the aircraft remains at a generally constant frequency value, and, in a further particular aspect of this example, without any uncommanded reductions in electrical load caused by lack of available electrical power.

As is also shown in FIG. 2, the system 110 can include a start converter 135 for the first energy converter 130a, and a generator control unit 134 for each of the starter generator 132 and the generator 133. The start converter 135 and the generator control units 134 can each be under the control of an overall controller 136, and any of the foregoing control devices can be computer-based and programmed with instructions for carrying out the functions described below. The start converter 135 can control the synchronous starter/generator 132 and the first constant speed drive 150a. For example, in one embodiment, the start converter 135 can be used to drive the starter/generator 132 as a starter rather than a generator during an engine start procedure. In addition, the start converter 135 can control the first constant speed drive 150a to operate in a variable speed manner. In particular, the first constant speed drive 150a can receive an input from the starter/generator 132 and can provide a variable speed output that drives the first shaft 115a. This ability can be particularly useful during cold engine starts when the oil in the engine is highly viscous. During an initial portion of the start-up procedure, the gear or power ratio of the first constant speed drive 150a can be selected to provide high torque at relatively low RPM to the first shaft 115a to overcome initially high viscous drag created by the cold engine oil and/or other temperature-sensitive elements of the engine. As the speed of the first shaft 115a increases and the viscosity of the oil decreases, the first constant speed drive 150a can be controlled to produce less torque at higher RPM over the course of the engine start process. In another embodiment, the controller can connect the starter/generator 132 directly to the shaft 115a, bypassing the constant speed drive 150a entirely (e.g., via a clutch arrangement or other selectable coupling). Then during engine start, the starter/generator, while being controlled by the start converter 135, applies a suitable starting torque to the engine to start it in a desirable manner.

Another advantage of the foregoing start capability is that the engine 111 can be started by electrical power only. For example, the starter/generator 132 can be powered by an auxiliary power unit (APU), a ground cart, or another device. In any of these embodiments, the engine 111 can be started without the need for a separate, pneumatically driven starter.

Another potential benefit of the foregoing arrangement is that the starter/generator 132 and the generator 133 are not mechanically connected directly to each other. Instead, their outputs are connected via the bus 140. As a result, the need for a mechanical coupling between the starter/generator 132 and the generator 133 is eliminated. This can avoid potential problems associated with having two generators coupled to a single gearbox that can potentially cause oscillations or other adverse interactions between the generators, which can damage or reduce the efficiency of the generators. This potential drawback can be eliminated via the foregoing arrangement.

The generator control units 134 can control the starter/generator 132 and the generator 133. For example, the generator control units 134 can coordinate the output of the starter/generator 132 and the generator 133 depending upon load requirements, and/or can make adjustments to the power output provided by the starter/generator 132 and the generator 133 in accordance with aircraft power requirements. In some cases, the output of the constant speed drives 150a, 150b can be adjusted to provide the same output frequencies. Accordingly, the overall controller 136 can control the operation of the constant speed drives 150a, 150b. In other embodiments, the systems or subsystems that provide the foregoing control functions can be different, and/or the control responsibilities can be shifted from one controller to another, but in general, the overall system can control the frequencies and phase relationships of the power produced by the converters 130a, 130b to be within selected ranges and/or limits.

Figure 3A:
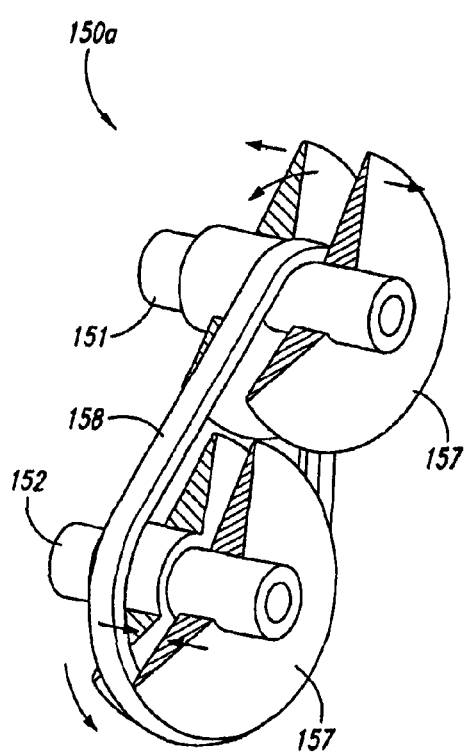
FIGS. 3A-3D illustrate constant speed drives configured in accordance with embodiments of the disclosure.
Figure 3B:
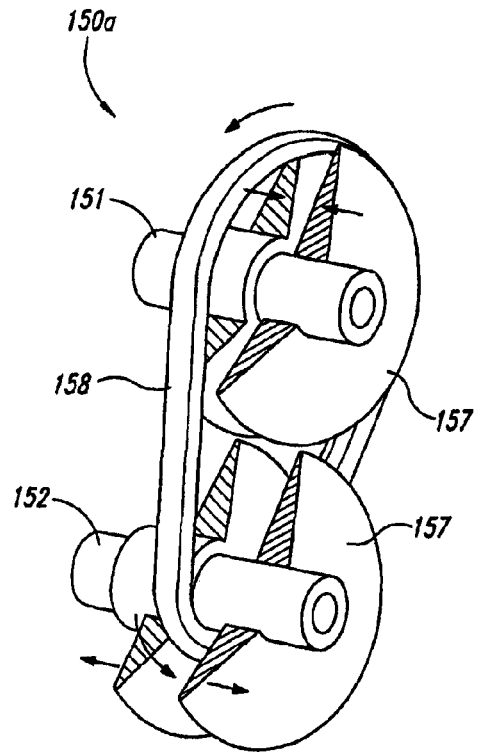

The constant speed drives illustrated in FIG. 2 can take any of a number of suitable forms. FIGS. 3A and 3B illustrate one arrangement for a constant speed drive 150a that includes an input shaft 151 and an output shaft 152, each coupled to a variable diameter pulley 157. A belt 158 extends around the pulleys 157. As the relative diameters of the pulleys 157 are changed (e.g., by moving mating halves of each pulley 157 toward and away from each other, as shown in FIGS. 3A and 3B), the speed of the output shaft 152 can be maintained at a constant rate, despite a variation in the speed of the input shaft 151.

Figure 3C:
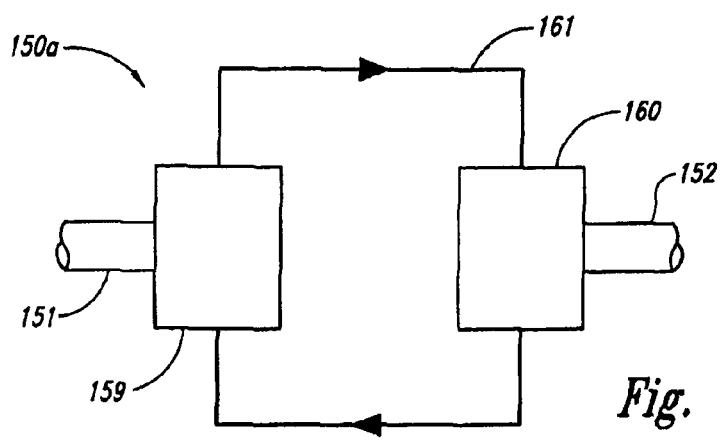

FIG. 3C illustrates another arrangement for a constant speed drive 150a in which an input shaft 151 drives a pump 159 and an output shaft 152 is driven by a motor 160. A fluid path 161 connects the pump 159 and the motor 160. By varying the output of the pump 159 (e.g., the pump displacement), this hydrostatic continuously variable transmission can maintain a constant rate for the output shaft 152 despite a varying rotation rate for the input shaft 151.

Figure 3D:
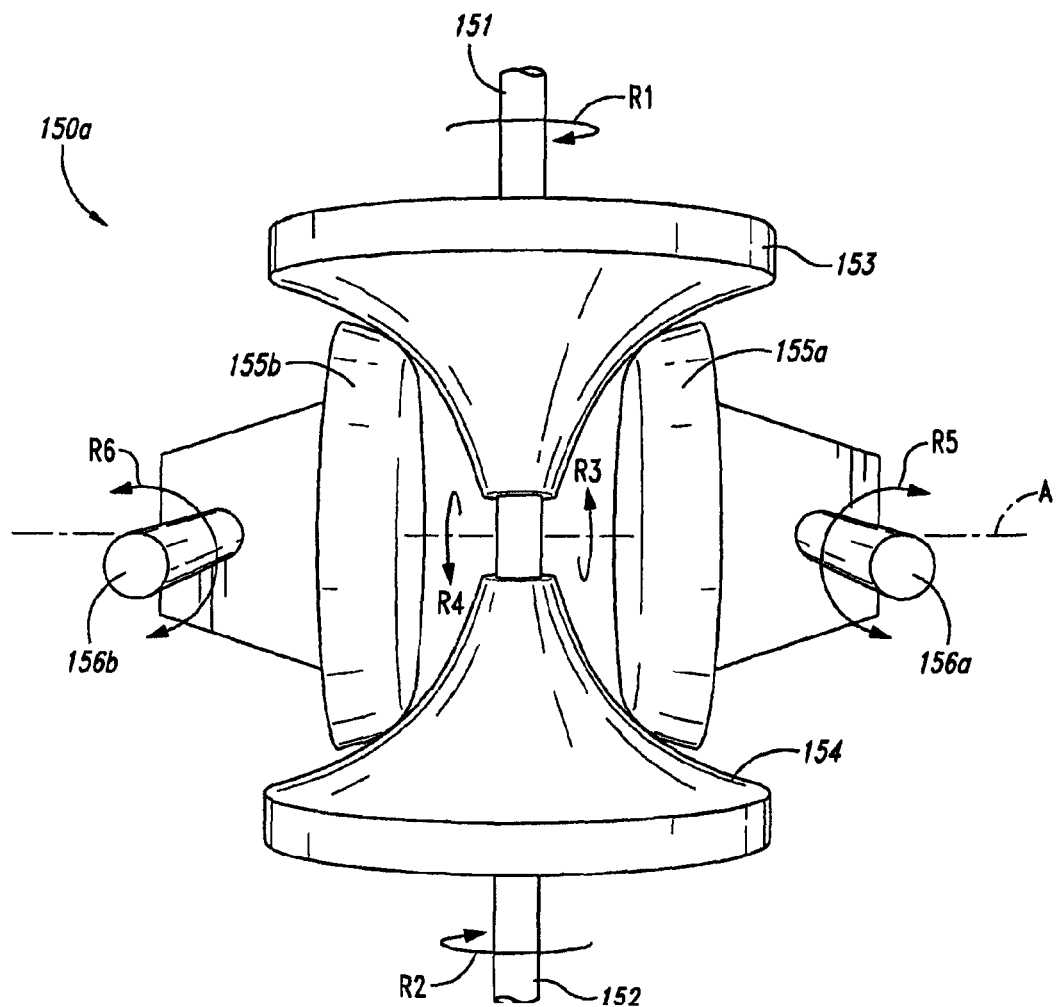

FIG. 3D illustrates a constant speed drive 150a configured in accordance with still another embodiment. In this embodiment, the constant speed drive 150a includes a toroidal continuously variable transmission (CVT). The device is generally similar to CVTs used in the automotive industry, including but not limited to devices produced by the Nissan Motor Company, Ltd. of Tokyo, Japan (e.g., the CVT provided with the 350 GT-8 automobile). Accordingly, the constant speed drive 150a can include an input shaft 151 that rotates in a first direction R1, and an output shaft 152 that rotates in an opposite direction R2. The input shaft 151 drives an input disk 153 and the output shaft 152 is driven by an output disk 154. The input disk 153 and output disk 154 have toroidal surfaces that mate with corresponding rollers 155, shown as a first roller 155a and a second roller 155b. Each of the rollers 155a, 155b rotates about an axis A as indicated by arrows R3 and R4, respectively. Each of the rollers 155a, 155b is also pivotable about a corresponding pivot axle 156a, 156b as indicated by arrows R5 and R6. As the rollers 155a, 155b pivot in a mirrored fashion about the respective pivot axes 156a, 156b, they change the drive ratio between the input shaft 151 and the output shaft 152. This technique can be used to create a constant rotation speed for the output shaft 152 while the rotation speed of the input shaft 151 varies, so as to provide constant frequency AC power as described above with reference to FIG. 2. The foregoing technique can also be used in reverse to vary the speed of the input shaft 151 given a constant input speed at the output shaft 152, for example, during engine starting, as was also described above with reference to FIG. 2.

The arrangement of the toroidal disks 153, 154 and corresponding rollers 155a, 155b can produce a constant output speed at the output shaft 152, even when the input speed at the input shaft 151 varies by a factor of about five, as is expected to be the case for a typical low pressure aircraft turbine engine shaft. Accordingly, this arrangement is expected to be suitable for installation in the system 110 described above with reference to FIG. 2.

Figure 4:
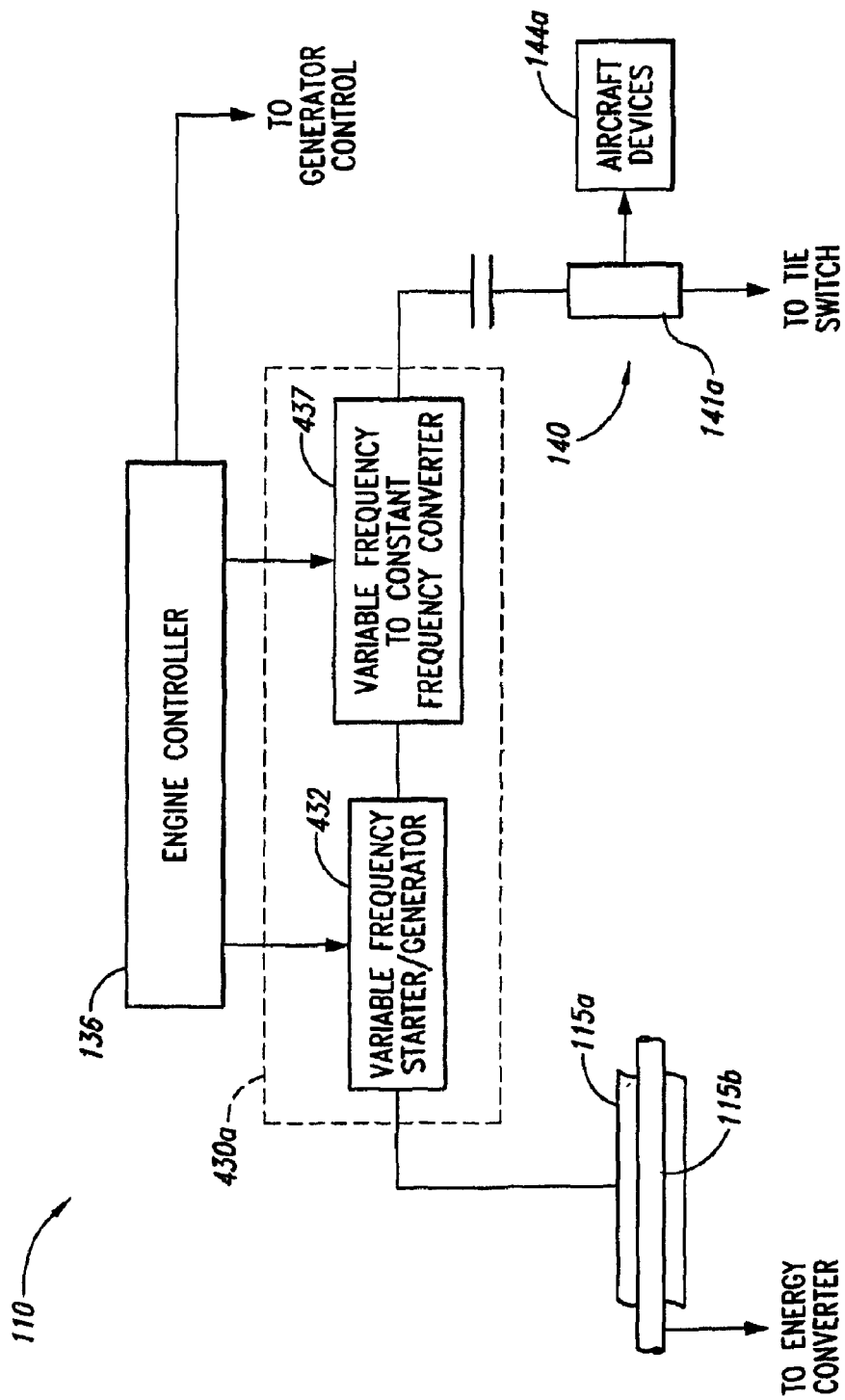
FIG. 4 illustrates an arrangement for providing constant frequency AC power in accordance with another embodiment of the disclosure.

In still further embodiments, the system 110 can include an energy converter that electrically converts a variable frequency AC power to a constant frequency AC power. For example, FIG. 4 illustrates portions of another embodiment of the system 110 shown in FIG. 2 that eliminates the constant speed drives 150a, 150b. Instead, the system 110 includes an energy converter 430a can in turn include a variable frequency starter/generator 432. The variable frequency starter/generator 432 receives power from the first shaft 115a during normal operations and provides power to the first shaft 115a during starting operations. The starter/generator 432 is coupled to a converter 437 that converts power from a variable frequency AC form to a constant frequency AC form. During the engine start mode, the converter 437 can act as the start converter, driving the starter/generator 432 to apply a suitable starting torque to the engine to start it in a desirable manner. For example, the converter can include a variable speed, constant frequency inverter such as are available from several suppliers, including Hamilton Sundstrand of Windsor Locks, Conn. Other aspects of the system 110, including arrangements for extracting power from the second shaft 115b, can be generally similar to the arrangements described above with reference to FIG. 2. The particular arrangement of the energy converter (e.g., whether it includes a mechanically-based constant speed drive, an inverter, or another device) can be selected based on criteria that include but are not limited to system weight, system cooling requirements, and overall system efficiencies.

From the foregoing, it will be appreciated that specific embodiments of the disclosure have been described herein for purposes of illustration, but that various modifications may be made without deviating from the disclosure. For example, the constant speed devices can have configurations other than those specifically shown and described above. The engines, generators, starter/generators, controllers, and/or other system components can be applied to aircraft having configurations other than those described above. In still further embodiments, the foregoing systems and components can be applied to non-aircraft power generation arrangements.

Certain aspects of the disclosure described in the context of particular embodiments may be combined or eliminated in other embodiments. For example, while aspects of the foregoing systems were described in the context of two-spool engines (e.g. engines having a high pressure spool and a low pressure spool), in other embodiments, similar principles can be applied to three-spool engines or engines having other configurations. In context of a three-spool engine, a separate energy converter can be coupled to each of the high pressure and low pressure spools and optionally, to an intermediate pressure spool as well. Further, while advantages associated with certain embodiments have been described in the context of those embodiments, other embodiments may also exhibit such advantages, and not all embodiments need necessarily exhibit such advantages. Accordingly the disclosure can include other embodiments not explicitly shown or described above.

We claim:

1. An aircraft system, comprising:
    an engine that includes:
        a first shaft;
        a second shaft;
    a starter/generator;
    a first constant speed drive connected between the first shaft and the starter/generator, to receive a first mechanical input rotating at a first variable rate, and provide a first mechanical output rotating at a first generally constant rate;
    a generator;
    a second constant speed drive connected between the second shaft and the generator to receive a second mechanical input rotating at a second variable rate, and provide a second mechanical output rotating at a second generally constant rate; and
    a bus system electrically connected between the starter/generator and the generator, to receive electrical power from the starter/generator and the generator.

2. The system of claim 1 wherein the second constant speed drive includes a mechanical, continuously variable transmission connected between the first shaft and the starter/generator.

3. The system of claim 2 wherein the mechanical, continuously variable transmission includes an input shaft, an output shaft, and a pivotable roller operatively coupled between the input shaft and the output shaft, and wherein the roller is pivotable between a first position with a first drive ratio between the input shaft and the output shaft, and a second position with a second drive ratio between the input shaft and the output shaft, and wherein the first and second drive ratios differ by a factor of about five or greater.

4. The system of claim 1 wherein the first constant speed drive includes a first mechanical, continuously variable transmission connected between the first shaft and the starter/generator, and wherein the second constant speed drive includes a second mechanical, continuously variable transmission connected between the second shaft and the generator.

5. The system of claim 4 wherein the first mechanical, continuously variable transmission produces a constant output speed given an input speed that varies by up to a factor of about two, and wherein the second mechanical, continuously variable transmission produces a constant output speed given an input speed that varies by a factor of up to about five.

6. The system of claim 1 wherein the second generally constant rate is generally the same as the first constant rate.

7. The system of claim 1 wherein the starter and the starter/generator provides generally the same frequency of electrical power.

8. The system of claim 1 wherein the bus system includes a first bus portion coupled to the starter/generator, a second bus portion coupled to the generator, and a switch between the first and second bus portions.

9. The system of claim 1 wherein the second shaft is positioned annularly around the first shaft.

10. An aircraft system, comprising:
    an engine that includes:
        a first shaft; and
        a second shaft;
    a bus system;
    a first energy converter coupled between the first shaft and the bus system, including a starter/generator and to convert a first variable frequency energy transmitted by the first shaft to a first generally constant frequency energy; and
    a second energy converter coupled between the second shaft and the bus system, the second energy converter including a generator to convert a second variable frequency energy transmitted by the second shaft to a second generally constant frequency energy.

11. The system of claim 10 wherein the first energy converter includes a mechanical, continuously variable transmission connected between the first shaft and the starter/generator, and wherein the transmission includes a variable rotation rate input shaft and a constant rotation rate output shaft.

12. The system of claim 10 wherein the starter/generator includes a variable frequency generator, and wherein the first energy converter includes an electrical inverter coupled to the starter/generator to receive variable frequency electrical power and produce a constant frequency power.

13. The system of claim 10 wherein the second energy converter includes a mechanical, continuously variable transmission connected between the second shaft and the generator, and wherein the transmission includes a variable rotation rate input shaft and a constant rotation rate output shaft.

14. The system of claim 10 wherein the first energy converter includes a first mechanical, continuously variable transmission coupled between the first shaft and the starter/generator, and wherein the second energy converter includes a second mechanical, continuously variable transmission coupled between the second shaft and the generator.

15. The system of claim 14 wherein the first mechanical, continuously variable transmission produces a constant output speed given an input speed that varies by up to a factor of about two, and wherein the second mechanical, continuously variable transmission produces a constant output speed given an input speed that varies by a factor of up to about five.

16. The system of claim 15 wherein the first generally constant frequency energy and the second generally constant frequency are generally at the same frequency.

17. A method for operating an aircraft system, comprising:
    starting an engine by driving a first shaft with a starter/generator;
    extracting a first portion of the energy from the first shaft with the starter/generator;
    extracting a second portion of energy from a second shaft of the engine;
    converting the first portion of energy from a first variable frequency to a first fixed frequency;
    converting the second portion of energy from a second variable frequency to a second fixed frequency; and
    distributing the first and second portions of energy to aircraft components via bus system.

18. The method of claim 17 wherein the second fixed frequency is generally identical to the first fixed frequency.

19. The method of claim 17, further comprising extracting the first portion of energy using a mechanical, continuously variable transmission.

20. The method of claim 19, further comprising starting the engine by varying a speed ratio between an input of the continuously variable transmission and an output of the continuously variable transmission as the engine starts.

21. The method of claim 17 wherein the aircraft system has more than one engine, and wherein the method further comprises:
   operating only a single engine of the aircraft during taxi maneuvers; and
   operating electrically driven equipment on the aircraft during the taxi maneuvers without reductions in electrical load that are not commanded by the aircraft crew.

22. The method of claim 17, further comprising:
   operating the engine during a cruise phase;
   operating the engine during an idle decent phase; and
   operating electrically driven equipment on the aircraft during the cruise and idle decent phases without reductions in electrical load that are not commanded by the aircraft crew.

23. The method of claim 18, further comprising maintaining the fixed frequency at a generally constant value over a flight that includes pre-takeoff ground maneuvers, takeoff, climb, cruise, decent, landing and post-landing ground maneuvers.

24. The method of claim 17, further comprising operating the engine at an idle speed that is independent of a load placed on the engine by distributing the first and second portions of energy to aircraft components.

25. The method of claim 17, further comprising:
   operating a plurality of electrically driven devices during decent and landing; and
   taxiing the aircraft after landing without reducing the number of operating electrically driven devices in electrical load in a manner that is not commanded by the aircraft crew.

* * * * *